(12) United States Patent
Lazzara et al.

(10) Patent No.: US 7,836,695 B2
(45) Date of Patent: Nov. 23, 2010

(54) SOLAR ENERGY SYSTEM

(75) Inventors: Samuel P. Lazzara, Los Alamitos, CA (US); Ronald C. Derby, Ashford, CT (US); William P. Dampier, Placentia, CA (US); Stanley H. Zelinger, Mission Viejo, CA (US)

(73) Assignee: Solar and Environmental Technologies Corporation, Staten Island, NY (US)

( * ) Notice: Subject to any disclaimer, the term of this patent is extended or adjusted under 35 U.S.C. 154(b) by 931 days.

(21) Appl. No.: 11/682,407

(22) Filed: Mar. 6, 2007

(65) Prior Publication Data

US 2008/0216822 A1  Sep. 11, 2008

(51) Int. Cl.
*B60K 16/00* (2006.01)
(52) U.S. Cl. .................................. 60/641.8; 60/641.15
(58) Field of Classification Search .... 60/641.8–641.15
See application file for complete search history.

(56) References Cited

U.S. PATENT DOCUMENTS

| | | | |
|---|---|---|---|
| 3,869,199 A | 3/1975 | Cummings | |
| 4,033,118 A | 7/1977 | Powell | |
| 4,079,591 A | 3/1978 | Derby et al. | |
| 4,205,657 A * | 6/1980 | Kelly | 126/603 |
| 4,280,327 A | 7/1981 | Mackay | |
| 4,286,141 A | 8/1981 | MacCracken | |
| 4,401,103 A | 8/1983 | Thompson | |
| 4,602,614 A * | 7/1986 | Percival et al. | 126/609 |
| 6,080,927 A * | 6/2000 | Johnson | 136/248 |
| 7,051,529 B2 | 5/2006 | Murphy | |
| 7,191,597 B2 * | 3/2007 | Goldman | 60/641.8 |
| 2005/0279095 A1 | 12/2005 | Goldman | |
| 2006/0048770 A1 | 3/2006 | Meksvanh | |

* cited by examiner

*Primary Examiner*—Hoang M Nguyen
(74) *Attorney, Agent, or Firm*—Banner & Witcoff, Ltd.

(57) ABSTRACT

A solar energy system includes a plurality of concentrating dishes and a plurality of heated air collectors. Each collector receives directed rays of sunlight from one of the concentrating dishes. A heated air distribution assembly collects air heated in the collectors. A thermal storage assembly is operably connected to the heated air distribution assembly and has a plurality of thermal storage elements. A steam generator is operably connected to the heated air distribution assembly and the thermal storage assembly. A steam turbine is operably connected to the steam generator.

30 Claims, 10 Drawing Sheets

SOLAR ENERGY SYSTEM

FIELD OF THE INVENTION

This invention relates generally to a solar energy system, and, in particular, to a solar energy system that heats air and stores it in an inert solid material.

BACKGROUND OF THE INVENTION

Many different configurations of solar energy power systems are known and available. Known solar energy power systems include photovoltaic arrays and Stirling Engine concentrators, which store no energy. Line-focus parabolic trough systems store energy at temperatures up to 350° C. Solar towers use salt as a working fluid and store energy at temperatures up to 630° C. Trough systems and solar towers use fossil fuel to supplement their solar processes.

It would be desirable to provide a solar energy system that reduces or overcomes some or all of the difficulties inherent in prior known devices. Particular objects and advantages will be apparent to those skilled in the art, that is, those who are knowledgeable or experienced in this field of technology, in view of the following disclosure of the invention and detailed description of certain embodiments.

SUMMARY

The principles of the invention may be used to advantage to provide a system for collecting and storing solar energy, and then generating electricity when the user desires it. Pollution-free electric power can be generated utilizing only sunlight as the fuel source to provide electricity whenever needed. Through the use of point-focus concentrating dishes, solar energy is converted into sensible heat at extremely high temperature. The use of high temperature air increases the efficiency of the system. The system stores this thermal energy in a storage vault for short or medium-term storage. Thermal energy is then drawn from the storage vault to drive conventional, utility grade, off-the-shelf steam turbines. The storage vault allows generation of power at any time, day or night.

Such a high peak and high average efficiency system with thermal energy storage advantageously allows time-separation of solar energy collection and electric power generation. Thereby providing a versatile system that can be used as its own local grid or attached to a regional grid. It can be configured in power plant ratings of from 130 kW to 40 or more Megawatts, with power plant annual capacity factors of more than 70% in certain embodiments. Its low cost will make this system a viable village-sized system in the sunny areas of the world.

In accordance with a first aspect, a solar energy system includes a plurality of concentrating dishes and a plurality of heated air collectors. Each collector receives directed rays of sunlight from one of the concentrating dishes. A heated air distribution assembly collects air heated in the collectors. A thermal storage assembly is operably connected to the heated air distribution assembly and has a plurality of thermal storage elements. A steam generator is operably connected to the heated air distribution assembly and the thermal storage assembly. A steam turbine is operably connected to the steam generator.

In accordance with another aspect, a solar energy system includes a housing and a plurality of rails on an upper surface of the housing. A collector assembly frame is movably connected to the rails. A plurality of parabolic mirrors is secured to the frame. Each of a plurality of heated air collectors receives directed rays of sunlight from one of the parabolic mirrors. A heated air distribution assembly collects air heated in the collectors. A thermal storage assembly is positioned within the housing and has a storage chamber including a plurality of thermal storage elements. The storage chamber is operably connected to the heated air distribution assembly. A steam generator is operably connected to the heated air distribution assembly and the storage chamber. A steam turbine is operably connected to the steam generator.

In accordance with a further aspect, a solar energy system includes a housing and a plurality of rails on an upper surface of the housing. A collector assembly frame is movably connected to the rails. A plurality of concentrating dishes is secured to the frame. Each of a plurality of heated air collectors receives directed rays of sunlight from one of the concentrating dishes. A heated air distribution assembly collects air heated in the collectors. Each of a plurality of azimuth control assemblies is secured to a portion of the collector assembly frame and movable along a rail. An elevation control assembly is operably connected to the parabolic mirrors to alter the elevation of the parabolic mirrors. A thermal storage assembly is positioned within the housing and has a storage chamber including a plurality of thermal storage elements. The storage chamber is operably connected to the heated air distribution assembly. A steam generator is operably connected to the heated air distribution assembly and the storage chamber. A steam turbine operably is connected to the steam generator.

Substantial advantage is achieved by providing a solar energy system that allows generation of power at any time, day or night. In particular, certain embodiments deliver electrical energy to a user community on-demand at high efficiency and at very high annual capacity factors without the use of supplemental fuels. Additionally, heated air, even at high temperatures, is not combustible or very corrosive, thereby helping improve safety.

These and additional features and advantages disclosed here will be further understood from the following detailed disclosure of certain embodiments.

The figures referred to above are not drawn necessarily to scale and should be understood to provide a representation of the invention, illustrative of the principles involved. Some features of the solar energy system depicted in the drawings have been enlarged or distorted relative to others to facilitate explanation and understanding. The same reference numbers are used in the drawings for similar or identical components and features shown in various alternative embodiments. Solar energy systems as disclosed herein would have configurations and components determined, in part, by the intended application and environment in which they are used.

DETAILED DESCRIPTION OF CERTAIN PREFERRED EMBODIMENTS

Figure 1:
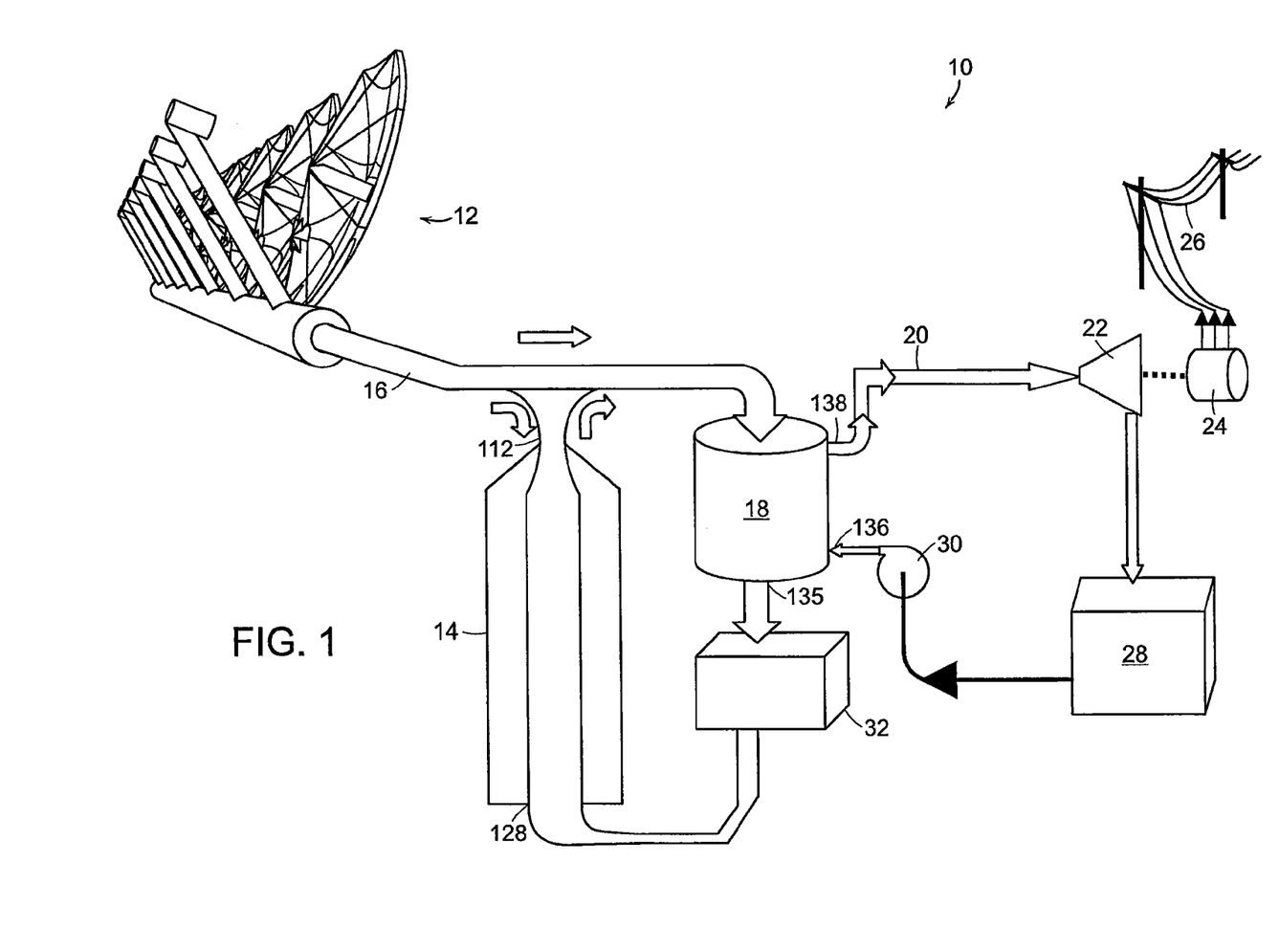
FIG. 1 is a diagrammatic view of a solar power energy system.

The present invention may be embodied in various forms. An embodiment of a solar power energy system 10 is shown in FIG. 1. System 10 includes a solar collection assembly 12 that collects heated air. The heated air may be delivered to a thermal storage assembly 14 by way of a heated air distribution assembly 16. The heated air can be transferred from thermal storage assembly 14 to a steam generator 18 at any time, such as during evening or night hours. The steam produced by steam generator 18 is then transferred by steam delivery piping 20 to a steam steam turbine 22 and generator 24 to produce electrical power. The electrical power can be used on location, or delivered to the local grid 26. A condenser 28 connected to steam turbine 22 returns liquid by way of a pumping system 30 to steam generator 18.

A blower system 32 is operably connected to the thermal storage assembly 14 and to the generator. Blower system 32 serves to draw air into thermal storage assembly 14 from solar collection assembly 12 when heat is being stored, and to force air from thermal storage assembly 14 into steam generator 18 when steam and electrical power is to be produced. Blower system 32 may include fans, blowers, or any other suitable air handling equipment capable of drawing the heated air from solar collection assembly 12 into thermal storage assembly 14 and/or generator 18, and of forcing air in a reverse direction through thermal storage assembly 14 into steam generator 18.

During peak daytime loads, the heated air from solar collection assembly 12 may be transported entirely to steam generator 18 for production of electrical power. At periods of reduced electrical load, a portion of the heated air from solar collection assembly 12 may be transported to steam generator 18 for power production, and a portion may be transported to thermal storage assembly 14 for later delivery to steam generator 18.

Figure 2:
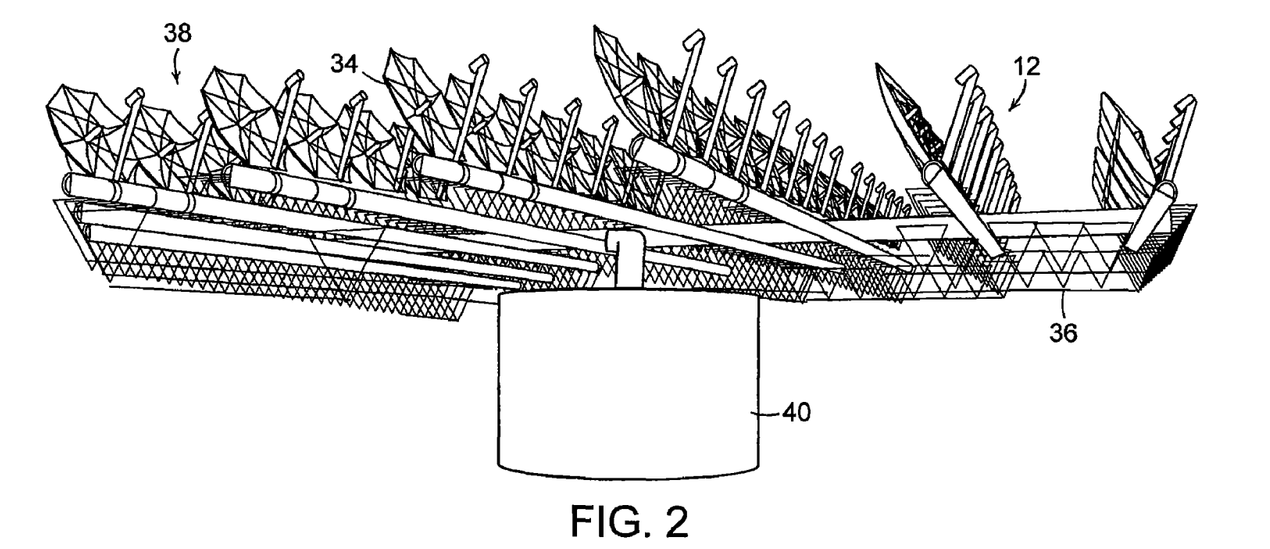
FIG. 2 is a perspective view of a solar collection assembly of the solar power energy system of FIG. 1.

An embodiment of a solar collection assembly 12 is seen in FIG. 2, and includes an array of interconnected concentrating dishes, such as parabolic mirrors 34, supported by a collector assembly collector assembly frame 36. Collector assembly collector assembly frame 36 may be a plurality of interconnected lengths of pipe, formed of porcelain, inconel, or other material suitable for supporting an array of concentrating dishes. In the illustrated embodiment, eighty eight (88) parabolic mirrors 34 are supported on collector assembly frame 36 and constitute a single array 38 of solar collection assembly 12. Collector assembly frame 36 is rotationally supported on a housing 40. In certain embodiments, parabolic mirrors 34 are approximately 3 meters in diameter. However, it is to be appreciated that parabolic mirrors of any diameter may be used, and other suitable diameters for parabolic mirrors 34 will become readily apparent to those skilled in the art, given the benefit of this disclosure.

Figure 3:
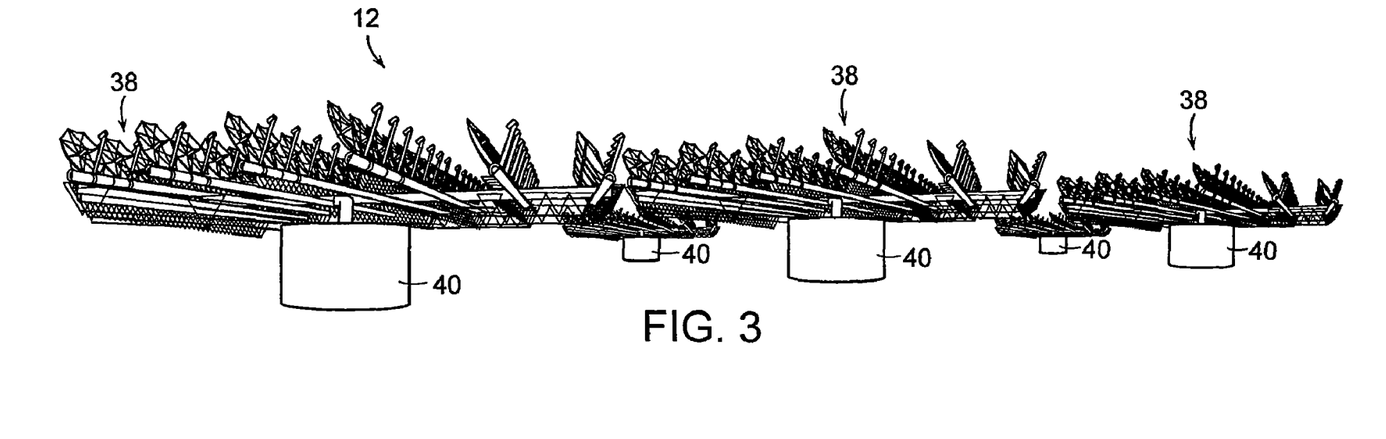
FIG. 3 is a perspective view of an alternative embodiment of a solar collection assembly of the solar power energy system of FIG. 1.

It is to be appreciated that in certain embodiments, solar collection assembly 12 may have a plurality of arrays 38 of parabolic mirrors 34. Any desired number of arrays 38 can be provided in solar collection assembly 12. Exemplary factors to consider when determining a suitable number of arrays are power demand, site limitations, and piping geometry. As seen in FIG. 3, a plurality of arrays 38 forms solar collection assembly 12. In certain embodiments, each array 38 has its own steam generator 18, and the steam from these multiple generators is used to power a large steam turbine 22. In such a large system, the power generating equipment, i.e., steam turbine 22 and its associated peripheral equipment may be centrally located to minimize losses in steam piping.

Figure 4:
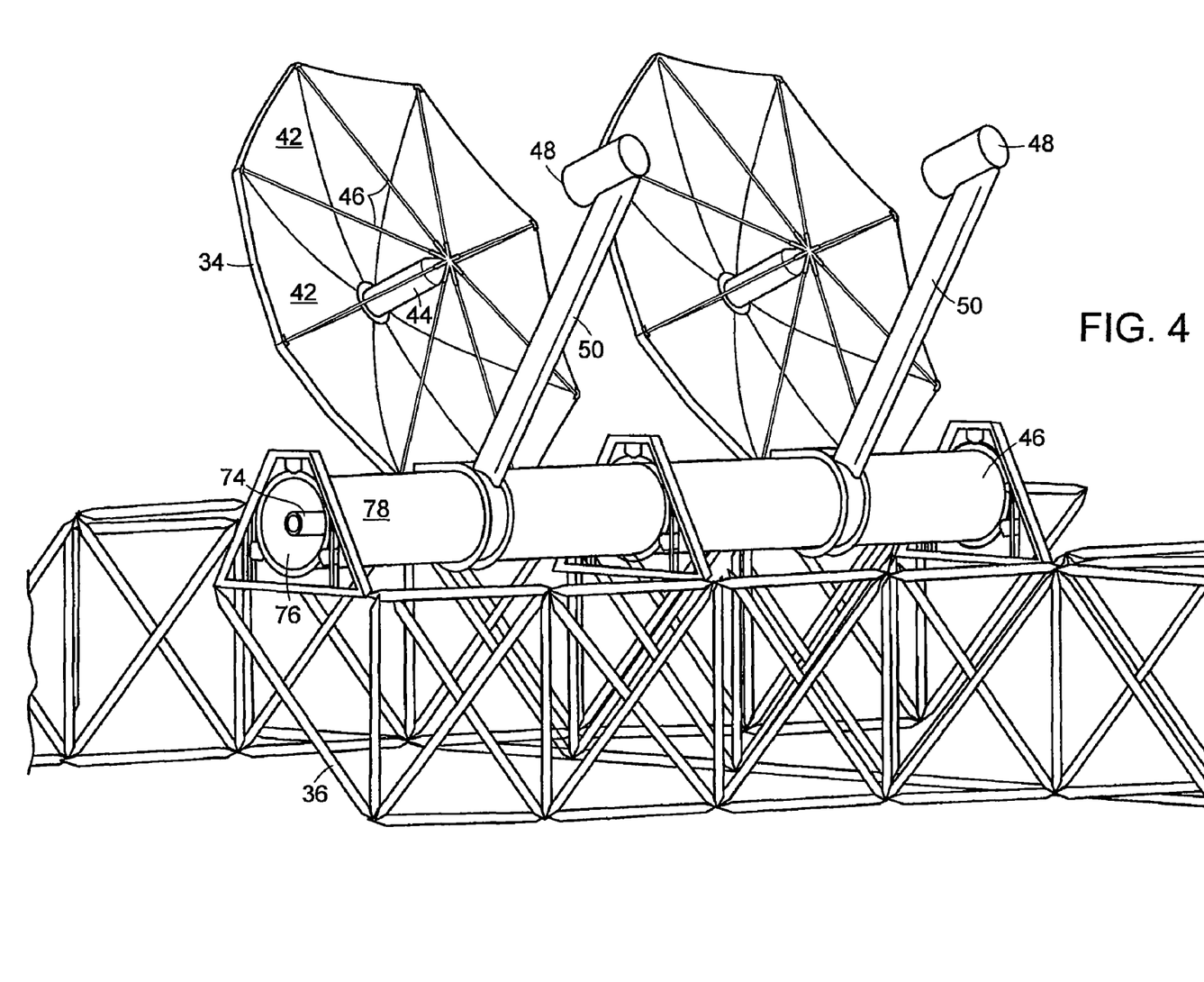
FIG. 4 is a perspective view of a portion of the solar collection assembly of FIG. 2.
Figure 5:
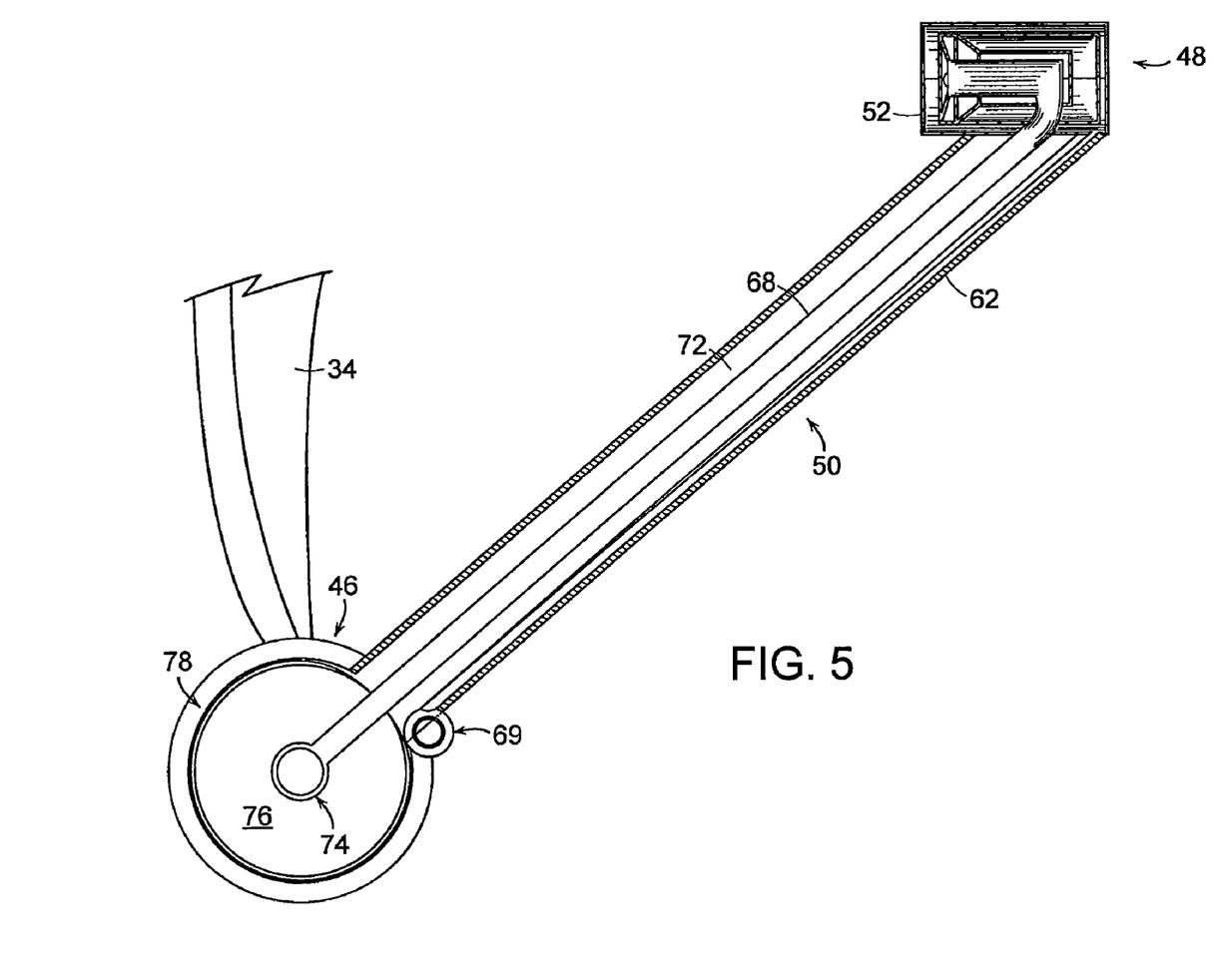
FIG. 5 is section view of a collector and collector tub of the solar collection assembly of FIG. 2.

As seen in greater detail in FIGS. 4-5, in certain embodiments, each parabolic mirror 34 is formed of a plurality of reflective segments 42 having a wedge-like shape. A support column 44 is provided in the center of mirror 34, with a plurality of struts extending from a top of support column 44 outwardly to the perimeter edges of segments 42 mirror 34. Segments 42 have a reflective surface formed of, for example, aluminum. Each parabolic mirror 34 is secured at a lower edge thereof to a conduit assembly 46 that carries heated air to thermal storage assembly 14.

As seen in FIGS. 4-7, the rays of sunlight incident on mirror 34 are directed to a heated air collector 48. A collector tube 50 is connected at a first end thereof to conduit assembly 46, with collector 48 connected to the second end of collector tube 50. Collector tube 50 may be formed of a high fire porcelain, for example. Other suitable materials for collector tube 50 capable of withstanding the high temperatures of the heated air will become readily apparent to those skilled in the art, given the benefit of this disclosure.

Figure 6:
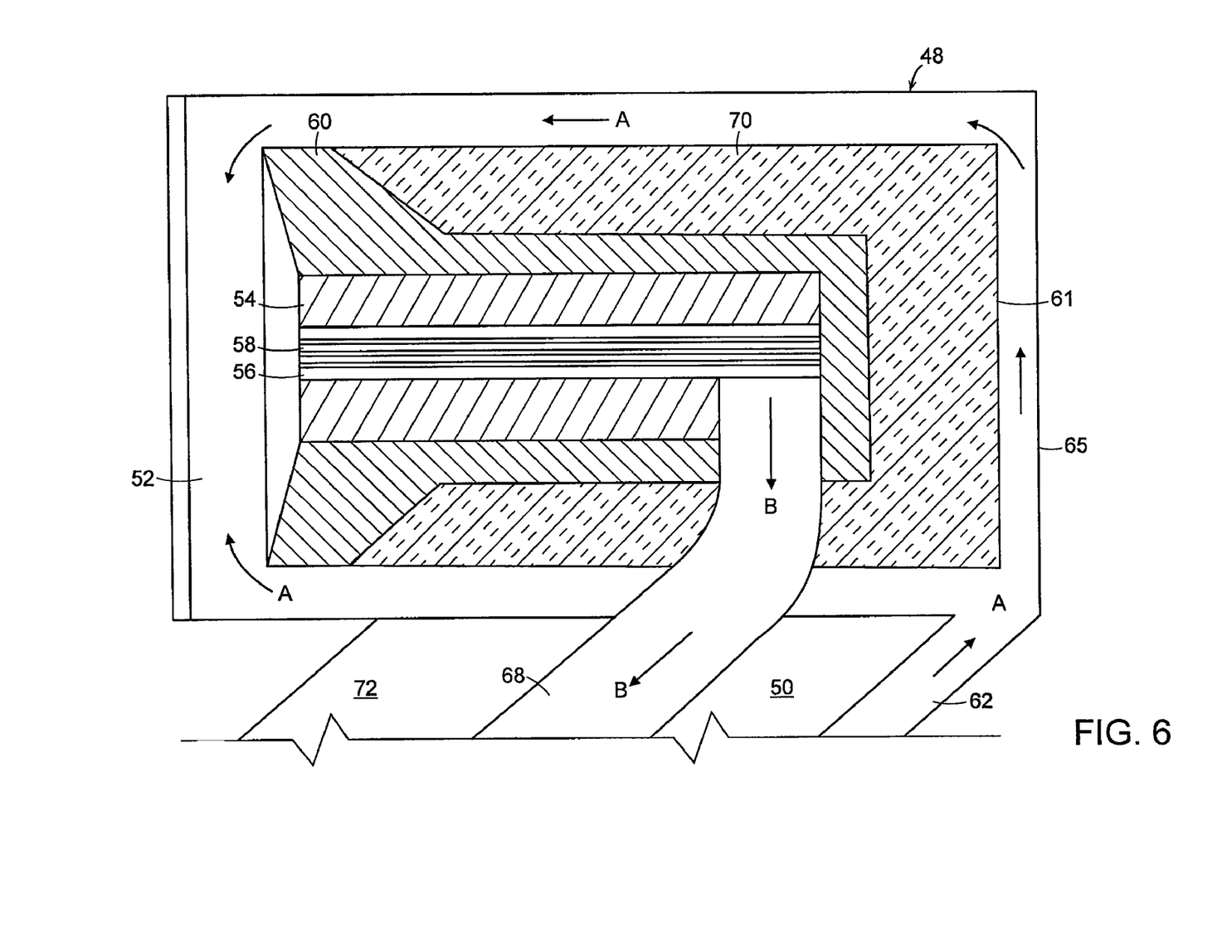
FIG. 6 is a section view of the collector of the solar collection assembly of FIG. 2.
Figure 7:
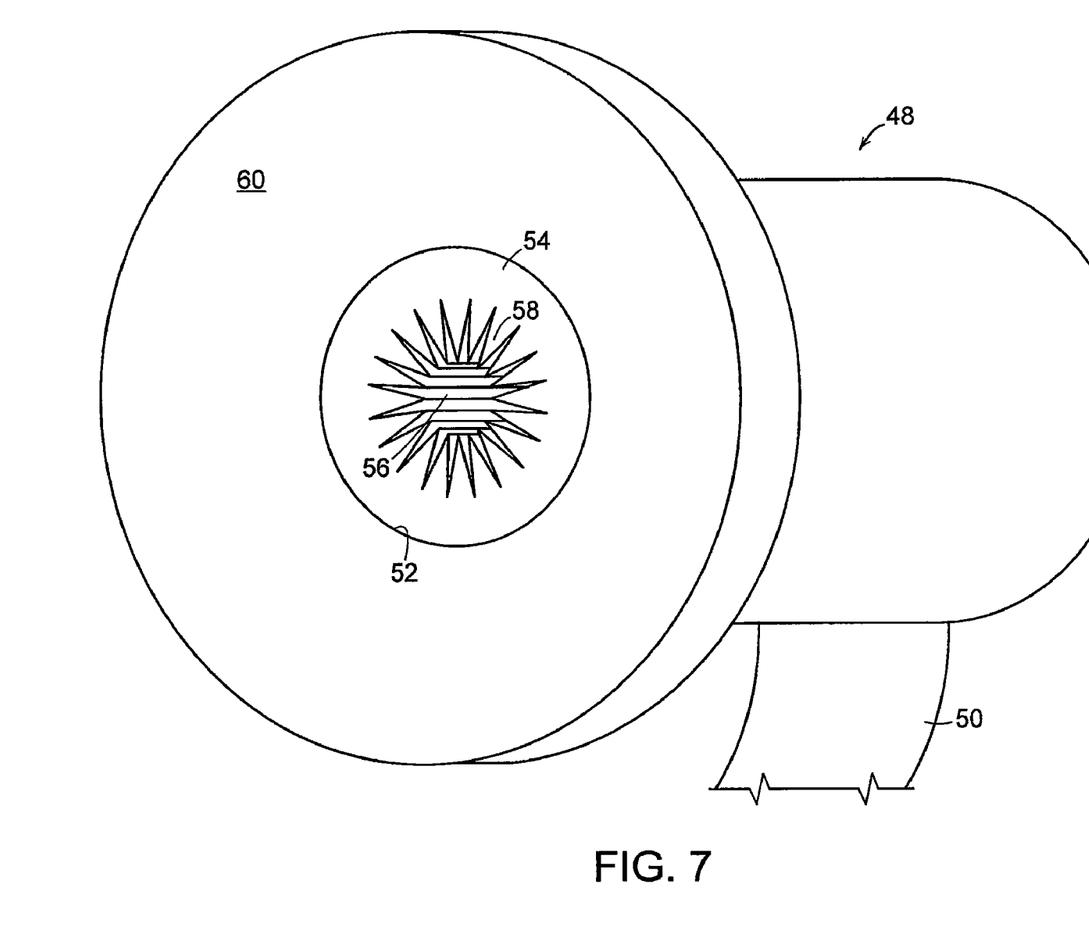
FIG. 7 is a perspective view of the collector of the solar collection assembly of FIG. 2.

Collector 48 is seen in greater detail in FIGS. 6-7. An opening 52 is formed at the end of collector 48 that faces mirror 34. Collector 48 has an inner core 54, an end of which is exposed through opening 52. Inner core 54 is a substantially cylindrical member with a central aperture 56 extending therethrough and a plurality of fins 58 extending inwardly from its inner surface. Inner core 54 may be formed of, for example, a low density ceramic such as berylia, thereby retaining the heat generated by the rays reflected by mirror 34.

An outer core 60 surrounds inner core 54, providing an additional heat retention member. Outer core 60 may be formed of, for example, a low conductivity, high density ceramic such as zirconia, or ceria-ZTP. Other suitable materials for outer core 60 will become readily apparent to those skilled in the art, given the benefit of this disclosure. An inner shell 61 surrounds outer core 60. In certain embodiments, inner shell 61 is formed of a metal, such as 316 stainless steel.

The rays of sunlight incident on mirror 34 are directed through opening 52 to the end of collector 48, heating up the air contained within central aperture 56. The heated air is absorbed by fins 58. The heated air then travels downwardly through collector tube 50. The air may be heated up to approximately 1,100° C. by solar collection assembly 12.

As seen in FIG. 6, cold air flows upwardly through an inlet passage 62 in collector tube 50, along an inlet passage 64 formed about the periphery of collector 48 and in through opening 52 into inner core 54 as indicated by the arrows A. Inlet passage 62 may be a pipe formed of aluminum in certain embodiments. An outer shell 65 is provided on the exterior of inlet passage 64. In certain embodiments, outer shell 65 is formed of a metal, such as 316 stainless steel.

The heated air travels from central aperture 56 of inner core 54 through an outlet passage 66 in collector 48 and then down through an outlet passage 68 in collector tube 50. In certain embodiments, outlet passage 68 is a pipe formed of porcelain. In certain embodiments, a blower 69 is provided at the lower end of inlet passage 62 in collector tube 50, helping to force the cold air up into collector 48.

Insulation 70 is provided in collector 48 between outer core 60 and inlet passage 64. Insulation 70 may be formed of mineral wool, for example. Insulation 72 is provided in collector tube 50 about outlet passage 68. Insulation 72 may be formed of mineral wool, for example. Other suitable insulation materials will become readily apparent to those skilled in the art, given the benefit of this disclosure.

The heated air that travels down through outlet passage 68 in collector tube 50 enters a distribution conduit 74 of heated air distribution assembly 16, as seen in FIG. 5. Each of a plurality of distribution conduits 74 collects heated air from a plurality of collector tubes 50, as seen in FIGS. 1-2. Each distribution conduit 74 is surrounded by insulation 76, such as mineral wool or other suitable insulation material. An outer shell 78 is provided around insulation 76. Outer shell 78 may be formed of a metal such as 316 stainless steel, for example.

Figure 8:
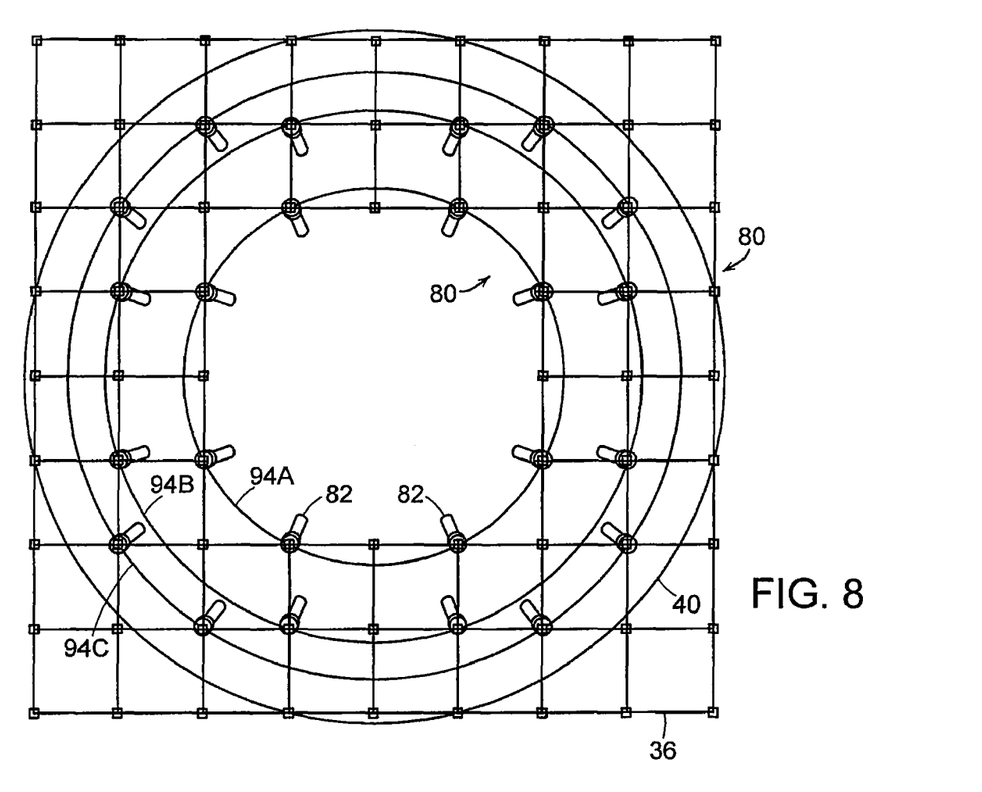
FIG. 8 is a plan view of an azimuth control system of the solar collection assembly of FIG. 2.
Figure 9:
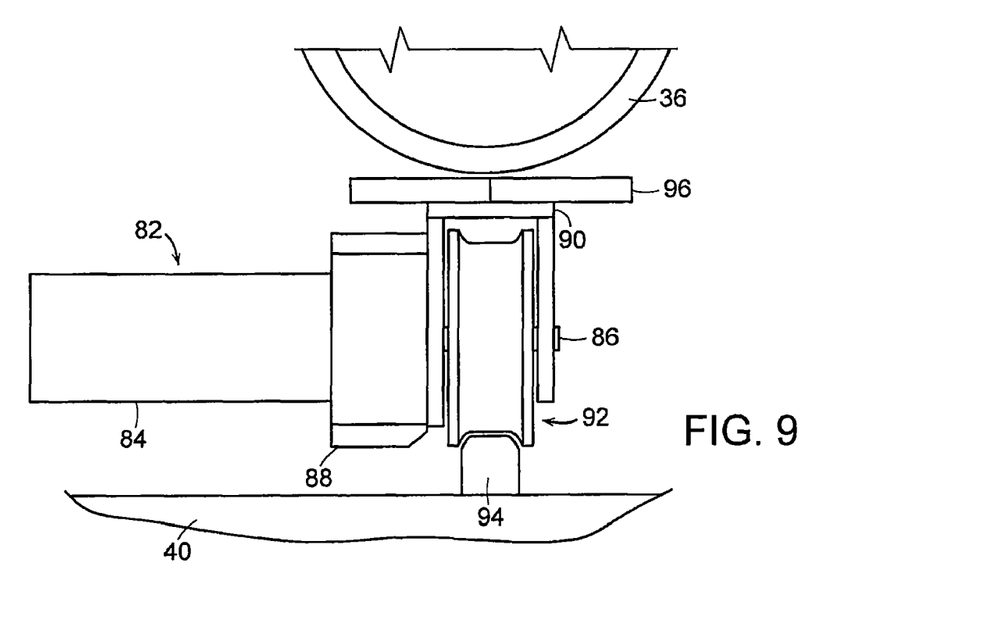
FIG. 9 is an elevation view of an azimuth control assembly of the azimuth control system of FIG. 8.

An azimuth control system 80 is shown in FIGS. 8-9. Azimuth control system 80 includes a plurality of azimuth control assemblies 82. Each azimuth control assembly 82 includes a motor 84 that rotatably drives an axle 86 by way of a gearbox 88. Axle 86 is supported by a frame member 90 and supports a wheel 92 that rides along a rail 94 positioned on the top of housing 40. As seen in the embodiment illustrated in FIG. 8, three rails 94A, 94B, 94C are positioned on top of housing 40. Collector assembly frame 36 is secured to a plurality of platform members 96, each of which is in turn secured to a frame member 90. Azimuth control system 80 rotates collector assembly frame 36 as the sun moves along the horizon, thereby optimizing the amount of sunlight captured by mirrors 34.

Figure 10:
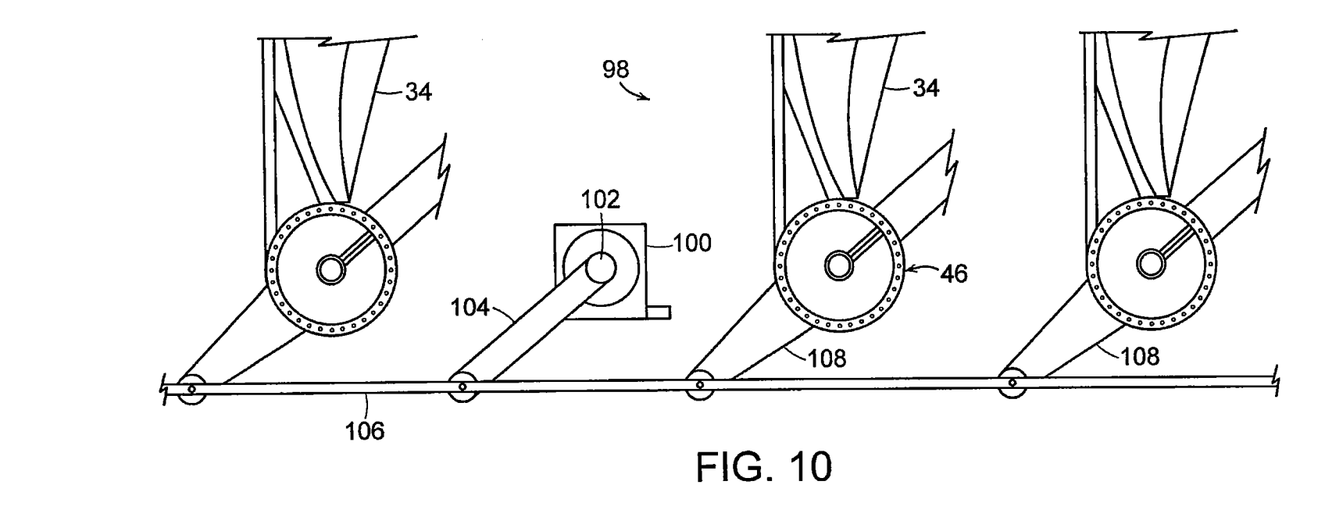
FIG. 10 is an elevation view of an elevation control assembly of the solar collection assembly of FIG. 2, shown with the mirrors oriented toward the horizon.
Figure 11:
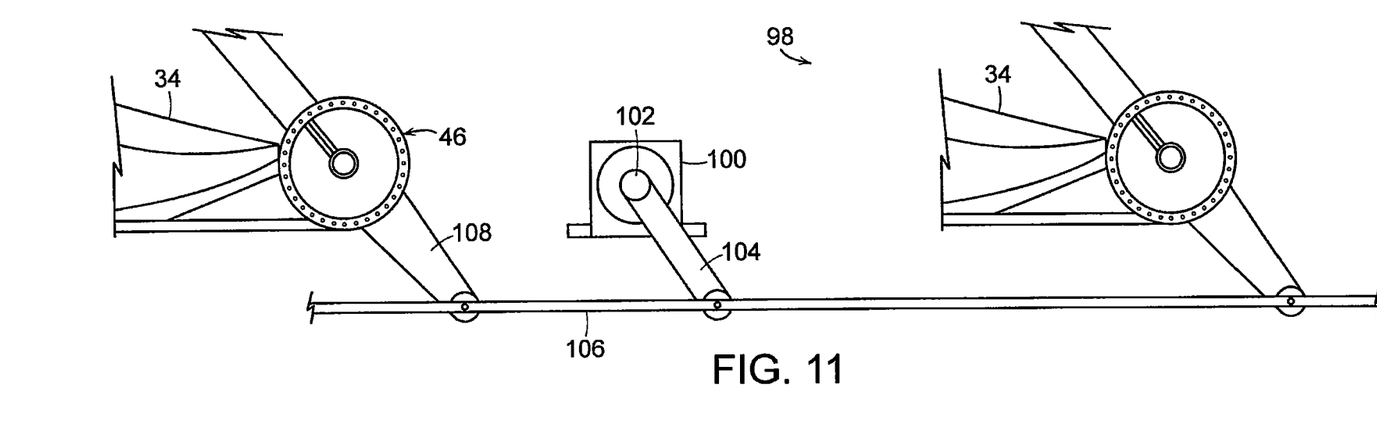
FIG. 11, is an elevation view of an elevation control assembly of the solar collection assembly of FIG. 2, shown with the mirrors aligned in a mid-day orientation

An elevation control assembly 98 is shown in FIG. 10. Elevation control assembly 98 includes a motor 100 with a drive shaft 102. Drive shaft 102 is secured to a drive arm 104 that is pivotally linked to a link arm 106. Each of a plurality of driven arms 108 is pivotally secured at a first end thereof to link arm 106 and is secured at a second end thereof to a conduit assembly 46, to which a mirror 34 is secured, thereby fixedly securing drive arm 108 to mirror 34. As drive shaft 102 rotates, drive arm 104 acts through link arm 106 to cause driven arms 108 to move, thereby altering the elevation of mirrors 34. As shown in FIG. 10, mirrors 34 are aligned as they would be at sunrise and sunset, that is, oriented toward the horizon. As shown in FIG. 11, mirrors are aligned in a mid-day orientation. Link arm 106, which may serve as a counterweight, can be formed of a thick-wall steel tube, for example.

In certain embodiments a first elevation control assembly 98 is positioned on one side of an array 38 of mirrors 34, with a second elevation control assembly 98 positioned on the opposed side of array 38.

Figure 12:
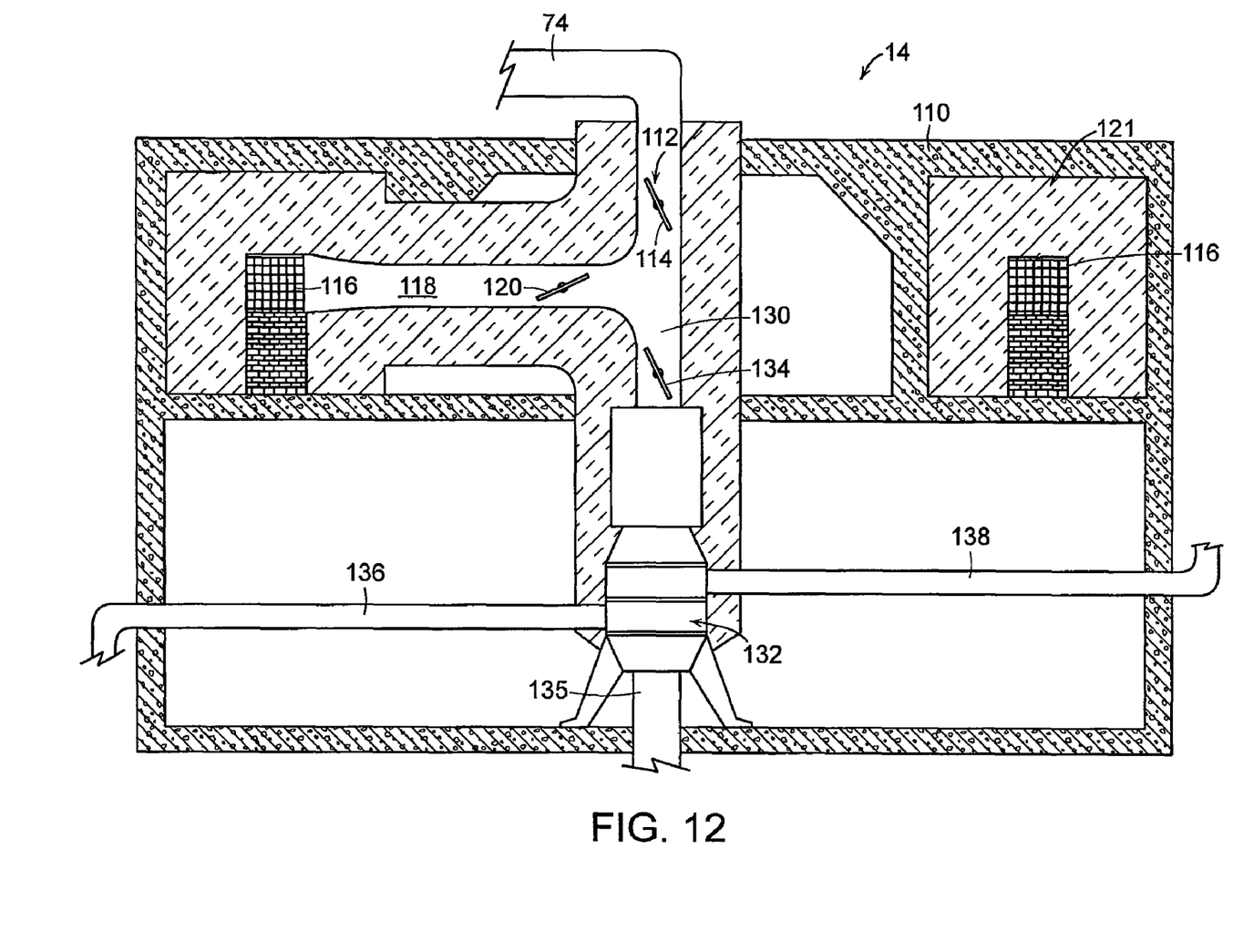
FIG. 12 is a side section view of the thermal storage assembly of the solar power energy system of FIG. 1.
Figure 13:
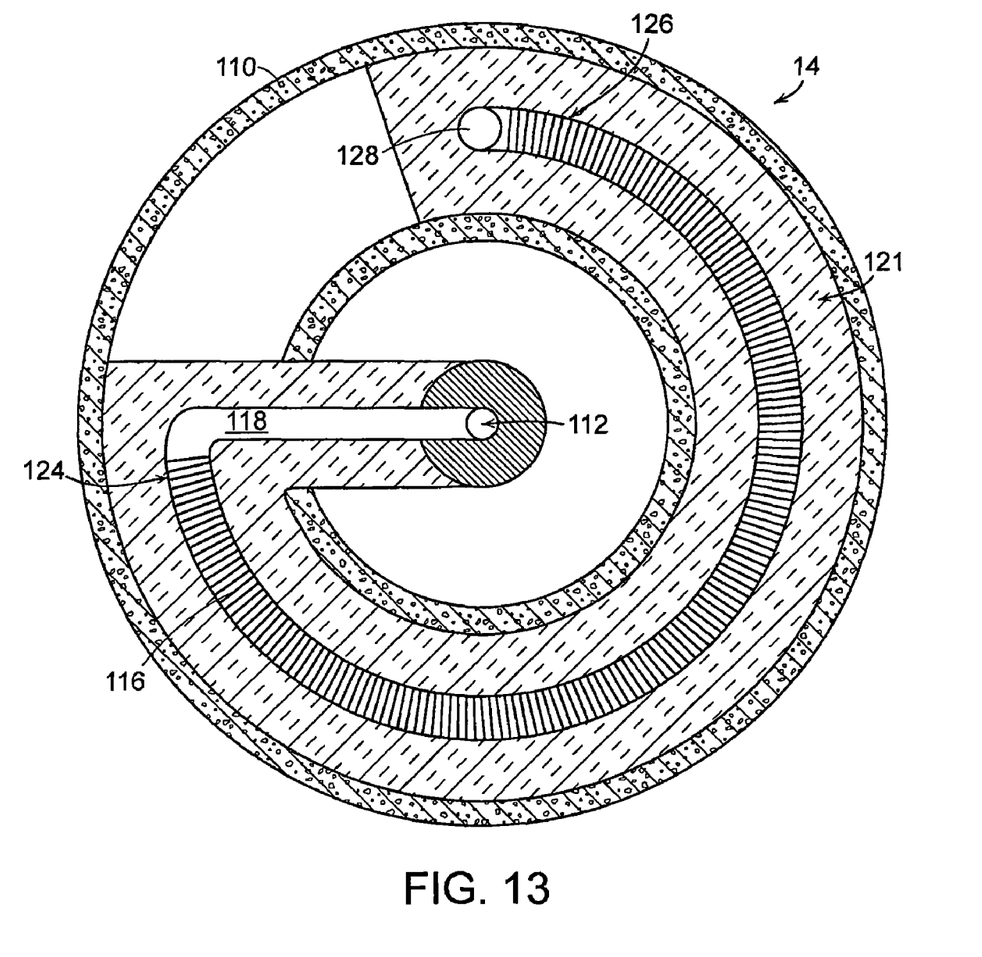
FIG. 13 is a top section view of the thermal storage assembly of the solar power energy system of FIG. 1.
Figure 14:
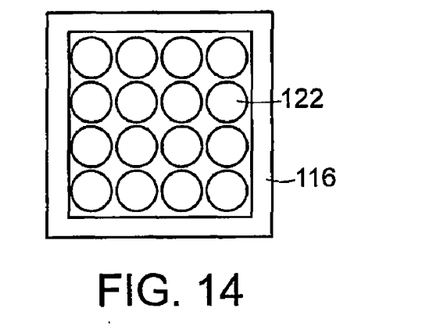
FIG. 14 is a section view of the storage chamber of the thermal storage assembly of FIGS. 12-13.

The heated air continues through distribution conduits 74 to thermal storage assembly 14. Thermal storage assembly 14, as seen in FIGS. 11-13 includes a storage housing 110. Heated air from distributions conduits 74 enters storage assembly 14 through an air inlet 112. A first valve 114 is located in air inlet 112 and serves to control and/or shut off the flow of air through into storage assembly 14. Heated air passes from air inlet 112 into a storage chamber 116 through a storage air inlet 118. A second valve 120 located in storage air inlet 118 serves to control and/or shut off the flow of air through storage chamber 116.

Storage chamber 116 may be formed of fire brick, brick-lined stainless steel, or ceramic-lined stainless steel. Storage chamber 116 is surrounded by insulation 121, which serves to retain heat therein. In certain embodiments, insulation 121 is mineral wool insulation. It is to be appreciated that other types of insulation will serve to retain heat within storage chamber 116, and other suitable insulation materials will become readily apparent to those skilled in the art, given the benefit of this disclosure.

In certain embodiments, storage chamber 116 has a rectangular cross-section and extends substantially circularly within storage housing 12 forming a substantial portion of a toroid. As seen in the embodiment illustrated in FIG. 12, storage chamber extends substantially circularly approximately 270° within storage housing 12, forming approximately ¾ of a toroid. A plurality of thermal storage elements 122 are positioned within storage chamber 116. Thermal storage elements 122 act to absorb and retain the heat introduced by the heated air into storage chamber 116.

In certain embodiments, as seen in FIG. 13, thermal storage elements 122 are substantially spherical. Spherical elements advantageously produce significant surface area so as to optimize heat absorption from the heated air passing through storage chamber 116. It is to be appreciated that thermal storage elements 122 can have any desired shape and or configuration, and that other suitable shapes for thermal storage elements 122 will become readily apparent to those skilled in the art, given the benefit of this disclosure. In certain embodiments, thermal storage elements 122 have a substantially smooth surface to reduce turbulence within storage chamber 116 and minimize pumping loss.

Thermal storage elements 122 may be formed of an inert material. In certain embodiments, thermal storage elements 122 are formed of a ceramic, porcelain, or alumina. Other materials for thermal storage elements 122 include magnesium oxide, aluminum nitride, and boron nitride. Other suitable materials for thermal storage elements 122 will become readily apparent to those skilled in the art, given the benefit of this disclosure.

As seen in FIG. 13, heated air is introduced into a first end 124 of storage chamber 116 and passes to a second end 126 of storage chamber 116 where it passes out through a storage air outlet 128. Second end 126 is naturally cooler than first end 124 since the thermal energy of the heated air is transferred to thermal storage elements 122 as the heated air passes through storage chamber 116. As can be seen in FIG. 1, the heated air may be drawn through storage chamber by blower system 32.

As seen in FIG. 12, a generator air inlet 130 is in fluid communication with air inlet 112 and storage air inlet 118, and introduces heated air into a steam generator 132. A third valve 134 is located in storage air inlet 118, and serves to control and/or shut off the flow of air through generator 132. The heated air is used to produce steam in steam generator 132 and exits steam generator 132 through a generator air outlet 135.

In certain embodiments, first valve 114, second valve 120, and third valve 134 may be formed of porcelain. Other suitable materials for the valves capable of withstanding the high temperatures of the heated air will become readily apparent to those skilled in the art, given the benefit of this disclosure.

A feedwater inlet 136 introduces water into generator 132 and a steam outlet 138 sends superheated steam from generator 132 to steam turbine 22 by way of steam delivery piping 20 to be used to produce electrical power.

It is to be appreciated that housing 110 of thermal storage assembly 14 and housing 40 upon which collector assembly frame 36 is rotationally supported may be one and the same structure.

Solar power energy system 10 can be operated in different manners, depending on various factors including load demand, for example. During times of a significant load, or energy demand, as seen in FIG. 12, first and third valves 112, 134 are open and second valve 120 is closed such that heated air will not enter storage chamber 116 and all the heated air flows directly into generator 132 for the production of steam and electrical energy in steam turbine 22.

At times of lower need, first valve 112 is completely open and second and third valves 120, 134 are partially open, allowing heated air to flow into both storage chamber 116 and generator 132, thereby allowing some of the heat to be stored and some of the heat to be used for the production of electricity.

When there is no energy demand, all of the heated air may be stored by opening first and second valves 112, 120 and closing third valve 134 such that all of the heated air flows into storage chamber 116. When the stored energy is needed from storage chamber 116, first valve 112 is closed and second and third valves 120, 132 are opened. Blower system 32 is then used to force air in reverse direction through storage chamber 116 such that heated air flows from storage chamber 116 out through storage air inlet 118 and into generator 132.

Under certain conditions when heated air is flowing directly from solar collection assembly 12 into generator 132, additional heated air may be introduced from storage chamber 116 by forcing air in the reverse direction through storage chamber 116.

Thus, it can be seen that solar power energy system 10 can be operated in various states in order meet different demand loads and requirements. Such a solar power system can provide electrical power with annual capacity factors greater than 70%.

As noted above, in certain embodiments, 88 parabolic mirrors 34 are used to form solar collection assembly 12.

In light of the foregoing disclosure of the invention and description of various embodiments, those skilled in this area of technology will readily understand that various modifications and adaptations can be made without departing from the scope and spirit of the invention. All such modifications and adaptations are intended to be covered by the following claims.

What is claimed is:

1. A solar energy system comprising:
   a plurality of concentrating dishes;
   a plurality of heated air collectors, each collector receiving directed rays of sunlight from one of the concentrating dishes;
   a heated air distribution assembly to collect air heated in the collectors;
   a thermal storage assembly operably connected to the heated air distribution assembly and having a plurality of thermal storage elements;
   a steam generator operably connected to the heated air distribution assembly and the thermal storage assembly such that heated air flows directly from the collectors to the steam generator without entering the thermal storage assembly under a first condition, directly from the collectors to the thermal storage assembly under a second condition, directly from the collectors to both the thermal storage assembly and the steam generator under a third condition, and directly from the thermal storage assembly to the steam generator under a fourth condition; and
   a steam turbine operably connected to the steam generator.

2. The solar energy system of claim 1, wherein the concentrating dishes are parabolic mirrors.

3. The solar energy system of claim 1, wherein the concentrating dishes are secured to a collector assembly frame and are movable in unison.

4. The solar energy system of claim 3, further comprising an azimuth control system having a plurality of azimuth control assemblies and at least one rail, each azimuth control assembly secured to a portion of the collector assembly frame and movable along one of the rails.

5. The solar energy system of claim 4, wherein each azimuth control assembly comprises:
   a frame member supporting a portion of the collector assembly frame;
   an axle extending through the frame member;
   a wheel supported by the axle and riding along one of the rails; and
   a motor operably connected to the axle to rotate the axle.

6. The solar energy system of claim 1, further comprising an elevation control assembly operably connected to the concentrating dishes to alter the elevation of the concentrating dishes.

7. The solar energy system of claim 6, wherein the elevation control assembly comprises:
   a motor;
   a drive arm driven by the motor;
   a link arm pivotally connected to and driven by the drive arm;
   and a plurality of driven arms; each driven arm pivotally connected to and driven by the link arm, and fixedly connected to one of the concentrating dishes.

8. The solar energy system of claim 1, wherein each collector comprises:
   an inner core having a central aperture extending therethrough;
   a plurality of fins extending inwardly from an interior surface of the inner core, one end of the fins receiving reflected rays from one of the concentrating dishes;
   an outer core surrounding the inner core;
   insulation surrounding the outer core;
   an inner shell surrounding the insulation;
   an outer shell surrounding the inner shell;
   an air inlet passage positioned between the inner and outer shells and in fluid communication with the central aperture of the inner core; and
   an air outlet passage in fluid communication with the central aperture of the inner core and the heated air distribution assembly.

9. The solar energy system of claim 8, further comprising a collector tube having a first end connected to the heated air distribution assembly and a second end connected to the collector, the collector tube housing a portion of the air outlet passage and a portion of the air inlet passage.

10. The solar energy system of claim 9, further comprising a blower in the collector tube to force air through the air inlet passage.

11. The solar energy system of claim 1, wherein the thermal storage assembly comprises:
    a housing having an air inlet;
    a first valve positioned in the air inlet;

a storage chamber having a storage air inlet in fluid communication with the air inlet and a storage air outlet, the thermal storage elements being positioned in the storage chamber;
a second valve positioned in the storage air inlet;
a generator air inlet in fluid communication with the air inlet and the storage air inlet; and
a third valve positioned in the generator air inlet.

12. The solar energy system of claim 11, wherein the storage chamber extends substantially circularly within the housing.

13. The solar energy system of claim 11, wherein the first, second and third valves are formed of a porcelain material.

14. The solar energy system of claim 11, further comprising a blower system operably connected to the storage chamber and a generator air outlet.

15. The solar energy system of claim 1, wherein the thermal storage elements are formed of an inert material.

16. The solar energy system of claim 1, wherein the thermal storage elements are formed of a ceramic material.

17. The solar energy system of claim 1, wherein the thermal storage elements are spherical.

18. A solar energy system comprising:
a housing;
a plurality of rails on an upper surface of the housing;
a collector assembly frame movably connected to the rails;
a plurality of parabolic mirrors secured to the frame;
a plurality of heated air collectors, each collector receiving directed rays of sunlight from one of the parabolic mirrors;
a heated air distribution assembly to collect air heated in the collectors;
a thermal storage assembly positioned within the housing and having a storage chamber including a plurality of thermal storage elements, the storage chamber being operably connected to the heated air distribution assembly;
a steam generator operably connected to the heated air distribution assembly and the storage chamber such that heated air flows directly from the collectors to the steam generator without entering the thermal storage assembly under a first condition, directly from the collectors to the thermal storage assembly under a second condition, directly from the collectors to both the thermal storage assembly and the steam generator under a third condition, and directly from the thermal storage assembly to the steam generator under a fourth condition; and
a steam turbine operably connected to the steam generator.

19. The solar energy system of claim 18, wherein the steam generator is positioned within the housing.

20. The solar energy system of claim 18, further comprising an azimuth control system having a plurality of azimuth control assemblies, each azimuth control assembly secured to a portion of the collector assembly frame and movable along one of the rails.

21. The solar energy system of claim 20, wherein each azimuth control assembly comprises:
a frame member supporting a portion of the collector assembly frame;
an axle extending through the frame member;
a wheel supported by the axle and riding along one of the rails; and
a motor operably connected to the axle to rotate the axle.

22. The solar energy system of claim 18, further comprising an elevation control assembly operably connected to the parabolic mirrors to alter the elevation of the parabolic mirrors.

23. The solar energy system of claim 22, wherein the elevation control assembly comprises:
a motor;
a drive arm driven by the motor;
a link arm pivotally connected to and driven by the drive arm;
and a plurality of driven arms; each driven arm pivotally connected to and driven by the link arm, and fixedly connected to one of the parabolic mirrors.

24. The solar energy system of claim 18, wherein each collector comprises:
an inner core having a central aperture extending therethrough, one end of the aperture receiving reflected rays from one of the parabolic mirrors;
a plurality of fins extending inwardly from an interior surface of the inner core;
an outer core surrounding the inner core;
insulation surrounding the outer core;
an inner shell surrounding the insulation;
an outer shell surrounding the inner shell;
an air inlet passage positioned between the inner and outer shells and in fluid communication with the central aperture of the inner core; and
an air outlet passage in fluid communication with the central aperture of the inner core and the heated air distribution assembly.

25. The solar energy system of claim 18, wherein the thermal storage assembly comprises:
a housing having an air inlet;
a first valve positioned in the air inlet;
storage air inlet at a first end of the storage chamber and in fluid communication with the air inlet;
a storage air outlet at a second end of the storage chamber;
a second valve positioned in the storage air inlet;
a generator air inlet in fluid communication with the air inlet and the storage air inlet; and
a third valve positioned in the generator air inlet.

26. The solar energy system of claim 18, wherein the thermal storage elements are ceramic spheres.

27. A solar energy system comprising:
a housing;
a plurality of rails on an upper surface of the housing;
a collector assembly frame movably connected to the rails;
a plurality of parabolic mirrors secured to the frame;
a plurality of heated air collectors, each collector receiving directed rays of sunlight from one of the parabolic mirrors;
a heated air distribution assembly to collect air heated in the collectors;
a plurality of azimuth control assemblies and at least one rail, each azimuth control assembly secured to a portion of the collector assembly frame and movable along one of the rails;
an elevation control assembly operably connected to the parabolic mirrors to alter the elevation of the parabolic mirrors;
a thermal storage assembly positioned within the housing and having a storage chamber including a plurality of inert thermal storage elements, the storage chamber being operably connected to the heated air distribution assembly;
a steam generator operably connected to the heated air distribution assembly and the storage chamber such that heated air flows directly from the collectors to the steam generator without entering the storage chamber under a first condition, directly from the collectors to the storage chamber under a second condition, directly from the collectors to both the storage chamber and the steam generator under a third condition, and directly from the storage chamber to the steam generator under a fourth condition; and a steam turbine operably connected to the steam generator.

28. The solar energy system of claim 27, wherein each collector comprises:

an inner core having a central aperture extending therethrough;

a plurality of fins extending inwardly from an interior surface of the inner core, one end of the fins receiving reflected rays from one of the concentrating dishes;

an outer core surrounding the inner core;

insulation surrounding the outer core;

an inner shell surrounding the insulation;

an outer shell surrounding the inner shell;

an air inlet passage positioned between the inner and outer shells and in fluid communication with the central aperture of the inner core; and an air outlet passage in fluid communication with the central aperture of the inner core and the heated air distribution assembly.

29. The solar energy system of claim 27, wherein the thermal storage assembly comprises:

an air inlet in the housing;

a first valve positioned in the air inlet;

a storage air inlet at a first end of the storage chamber in fluid communication with the air inlet;

a storage air outlet at a second end of the storage chamber;

a second valve positioned in the storage air inlet;

a generator air inlet in fluid communication with the air inlet and the storage air inlet; and a third valve positioned in the generator air inlet.

30. The solar energy system of claim 27, wherein the thermal storage elements are ceramic spheres.

* * * * *